(12) United States Patent
Hassager et al.

(10) Patent No.: US 12,501,230 B2
(45) Date of Patent: Dec. 16, 2025

(54) HEARING DEVICE

(71) Applicant: GN Audio A/S, Ballerup (DK)

(72) Inventors: Henrik Gert Hassager, Ballerup (DK); Søren Helstrup Kvist, Ballerup (DK)

(73) Assignee: GN AUDIO A/S, Ballerup (DK)

( * ) Notice: Subject to any disclaimer, the term of this patent is extended or adjusted under 35 U.S.C. 154(b) by 180 days.

(21) Appl. No.: 18/052,983

(22) Filed: Nov. 7, 2022

(65) Prior Publication Data
US 2023/0209298 A1 Jun. 29, 2023

(30) Foreign Application Priority Data
Dec. 28, 2021 (EP) .................................... 21217911

(51) Int. Cl.
| | | |
|---|---|---|
| *G01C 25/00* | (2006.01) | |
| *G01S 13/42* | (2006.01) | |
| *G01S 13/86* | (2006.01) | |
| *H01Q 1/27* | (2006.01) | |
| *H01Q 3/36* | (2006.01) | |
| *H04S 7/00* | (2006.01) | |
| *G01S 13/02* | (2006.01) | |

(52) U.S. Cl.
CPC .............. *H04S 7/304* (2013.01); *G01C 25/00* (2013.01); *G01S 13/426* (2013.01); *G01S 13/86* (2013.01); *H01Q 1/273* (2013.01); *H01Q 3/36* (2013.01); *G01S 2013/0245* (2013.01); *H04S 2420/01* (2013.01)

(58) Field of Classification Search
CPC ...... H04S 7/304; H04S 2420/01; H04S 7/303; G01C 25/00; G01S 13/426; G01S 13/86; G01S 2013/0245; H01Q 1/273; H01Q 3/36; H04R 1/10; H04R 2201/10
USPC .......................................................... 381/303
See application file for complete search history.

(56) References Cited

U.S. PATENT DOCUMENTS

| | | | |
|---|---|---|---|
| 9,544,706 B1 | 1/2017 | Hirst | |
| 10,782,782 B1* | 9/2020 | DeSalvo | G06F 3/016 |
| 2016/0320847 A1 | 11/2016 | Coleman et al. | |
| 2018/0220253 A1* | 8/2018 | Kärkkäinen | H04R 5/033 |
| 2018/0353086 A1* | 12/2018 | Turner | G01S 13/50 |
| 2019/0094350 A1* | 3/2019 | Baheti | G01S 7/415 |
| 2020/0174735 A1* | 6/2020 | Gomes | G06F 3/165 |
| 2023/0063476 A1* | 3/2023 | Meyer | G01S 7/417 |

OTHER PUBLICATIONS

The extended European search report issued in European Application No. 21217911.3, dated Jun. 13, 2022.

* cited by examiner

*Primary Examiner* — Carolyn R Edwards
*Assistant Examiner* — Friedrich Fahnert
(74) *Attorney, Agent, or Firm* — HSML P.C.

(57) ABSTRACT

The present disclosure relates to a hearing device comprising a first radar sensor configured for obtaining first radar data indicative of a difference in the orientation of a head of the user and a further body part of the user. A processing unit of the hearing device is configured to receive the first radar data from the first radar sensor and determine, based on the first radar data, a first relative orientation, wherein the first relative orientation is a difference in the orientation of the head of the user and the further body part of the user.

15 Claims, 2 Drawing Sheets

HEARING DEVICE

TECHNICAL FIELD

The present disclosure relates to a hearing device, a hearing system, and a method for determining an orientation of a head of a user relative to a further body part of the user.

BACKGROUND

In normal headphone listening, when the listener rotates his head, the sound scene rotates accordingly. However, the rotation of the sound scene may not always be desirable, as in some cases the rotation of the sound scene may ruin the immersion of a user, especially if the user is in a virtual or augmented reality setting. To avoid ruining the immersion of a user, headtracking is sometimes deployed. Head orientation information may then be used to control spatial processing to compensate for head rotations.

The spatial processing is typically performed by applying head related transfer function (HRTF) filtering to produce binaural signals from a monophonic or stereo input signal. HRTF filtering creates artificial localization cues including interaural time difference (ITD), frequency dependent interaural level difference (ILD) and spectral clues that auditory system uses to define a position of the sound event. The HRTF characterizes how an ear receives a sound from a point in space and is thus highly dependent on the current head orientation relative to the point in space.

Thus, headtracking allows for the use of head motion to improve spatial processing of audio. Currently, modern microelectromechanical system (MEMS) or piezoelectric accelerometers, gyroscopes and magnetometers are known to provide low cost and miniature components that can be used for orientation tracking. This tracking is based on absolute measurements of the direction of gravity and Earth's magnetic field relative to the device. Gyroscopes provide angular rate measurements which can be integrated to obtain accurate estimates of the changes in the orientation. The gyroscope is fast and accurate, but the integration error will always cumulate, so absolute measurements are required. Magnetometers, unfortunately, suffer from significant calibration issues, of which only some have been solved. Furthermore, the aforementioned components provide absolute measurements for orientation, however the absolute orientation may not be the correct orientation to use for spatial processing, e.g., in the case of a person driving a car it may be undesirable for the sound scene to rotate together with the car turning instead of being dependent on the head movement of the user.

WO2017051079 A1 discloses an apparatus comprising a processor configured to: determine a first orientation value of a head of a user of the apparatus relative to a further body part of the user using at least one orientation sensor; and control a 3D audio reproduction function of the apparatus based on the first orientation value.

SUMMARY

It is an object according to a first aspect of the present disclosure to provide an improved hearing device. According to the first aspect of the disclosure there is provided a hearing device, comprising a first housing for being worn at and/or in a first ear of a user, and a processing unit configured to control functionality of the hearing device, characterized in that, the hearing device further comprises a first radar sensor configured for obtaining first radar data indicative of a difference in the orientation of a head of the user and a further body part of the user, and wherein the processing unit is further configured to receive the first radar data from the first radar sensor, determine, based on the first radar data, a first relative orientation, wherein the first relative orientation is a difference in the orientation of the head of the user and the further body part of the user, and outputting the first relative orientation.

Consequently, an improved hearing device is provided. The improved hearing device provides an improved way of determining a head orientation. For example, in a situation where a user is in a car and the car turns, the orientation of the head relative to the further body part does not undergo a change, whereas conventional method reliant on gyroscopes or similar would measure a change in the head orientation, the same situation may be experienced for a user walking and turning. The hearing device according to the disclosure, thus overcomes the drawback of conventional solutions, which would have determined that a user had turned their head, while that may not necessarily be true. Hence, the hearing device according to the disclosure may render the reliance on absolute orientation measurements obsolete, or the hearing device according to this disclosure may complement existing head tracking solutions.

Outputting the first relative orientation is to be interpreted broadly. Outputting the first relative orientation may be interpreted broadly as outputting the first relative orientation for use in further processing, e.g., in processing of an audio signal, or outputting the first relative orientation to another processor. Outputting may be understood as outputting the first relative orientation for display to the user, or alternatively another person than the user, e.g., a sound technician.

The hearing device is configured to be worn by a user. The hearing device may be arranged at the user's ear, on the user's ear, over the user's ear, in the user's ear, in the user's ear canal, behind the user's ear, and/or in the user's concha, i.e., the hearing device is configured to be worn at the user's ear.

The hearing device may be configured to be worn by a user at each ear, e.g., a pair of ear buds or a head set with two earcups. In the embodiment where the hearing device is to be worn at both ears, the components meant to be worn at each ear may be connected, such as wirelessly connected and/or connected by wires, and/or by a strap. The components meant to be worn at each ear may be substantially identical or differ from each other.

The hearing device may be a hearable such as a headset, headphones, earphones, ear bud, hearing aids, an over the counter (OTC) hearing device, a hearing protection device, a one-size-fits-all hearing device, a custom hearing device or another head-wearable hearing device.

The hearing device may be embodied in various housing styles or form factors. Some of these form factors are earbuds, on the ear headphones, or over the ear headphones. The person skilled in the art is aware of various kinds of hearing devices and of different options for arranging the hearing device in and/or at the ear of the hearing device wearer.

The hearing device may comprise one or more input transducers. The one or more input transducers may comprise one or more microphones. The one or more input transducers may comprise one or more vibration sensors configured for detecting bone vibration. The one or more input transducer(s) may be configured for converting an acoustic signal into an electric input signal. The electric input signal may be an analogue signal. The electric input signal may be a digital signal. The one or more input transducer(s) may be coupled to one or more analogue-to-digital converter(s) configured for converting the analogue input signal into a digital input signal.

The hearing device may comprise one or more antenna(s) configured for wireless communication. The one or more antenna(s) may comprise an electric antenna. The electric antenna is configured for wireless communication at a first frequency. The first frequency may be above 800 MHz, preferably a wavelength between 900 MHz and 6 GHz. The first frequency may be 902 MHz to 928 MHz. The first frequency may be 2.4 to 2.5 GHz. The first frequency may be 5.725 GHz to 5.875 GHz. The one or more antenna(s) may comprise a magnetic antenna. The magnetic antenna may comprise a magnetic core. The magnetic antenna comprises a coil. The coil may be coiled around the magnetic core. The magnetic antenna is configured for wireless communication at a second frequency. The second frequency may be below 100 MHZ. The second frequency may be between 9 MHZ and 15 MHZ.

The hearing device may comprise one or more wireless communication unit(s). The one or more wireless communication unit(s) may comprise one or more wireless receiver(s), one or more wireless transmitter(s), one or more transmitter-receiver pair(s), and/or one or more transceiver(s). At least one of the one or more wireless communication unit(s) may be coupled to the one or more antenna(s). The wireless communication unit may be configured for converting a wireless signal received by at least one of the one or more antenna(s) into an electric input signal. The hearing device may be configured for wired/wireless audio communication, e.g., enabling the user to listen to media, such as music or radio, and/or enabling the user to perform phone calls.

A wireless signal may originate from external source(s), such as spouse microphone device(s), wireless audio transmitter, a smart computer, and/or a distributed microphone array associated with a wireless transmitter.

The hearing device may be configured for wireless communication with one or more external devices, such as one or more accessory devices, such as a smartphone and/or a smart watch.

The hearing device includes a processing unit. The processing unit may be configured for processing one or more input signals. The processing may comprise compensating for a hearing loss of the user, i.e., apply frequency dependent gain to input signals in accordance with the user's frequency dependent hearing impairment. The processing may comprise performing feedback cancellation, beamforming, tinnitus reduction/masking, noise reduction, noise cancellation, speech recognition, bass adjustment, treble adjustment, face balancing and/or processing of user input. The processing unit may be a processor, an integrated circuit, an application, functional module, etc. The processing unit may be implemented in a signal-processing chip or a printed circuit board (PCB). The processing unit is configured to provide an electric output signal based on the processing of one or more input signals. The processing unit may be configured to provide one or more further electric output signals. The one or more further electric output signals may be based on the processing of one or more input signals. The processing unit may comprise a receiver, a transmitter and/or a transceiver for receiving and transmitting wireless signals. The processing unit may control one or more playback features of the hearing device.

The hearing device comprises an output transducer. The output transducer may be coupled to the processing unit. The output transducer may be a loudspeaker, or any other device configured for converting an electrical signal into an acoustical signal. The receiver may be configured for converting an electric output signal into an acoustic output signal.

The wireless communication unit may be configured for converting an electric output signal into a wireless output signal. The wireless output signal may comprise synchronization data. The wireless communication unit may be configured for transmitting the wireless output signal via at least one of the one or more antennas.

The hearing device may comprise a digital-to-analogue converter configured to convert an electric output signal or a wireless output signal into an analogue signal.

The hearing device may comprise a power source. The power source may comprise a battery providing a first voltage. The battery may be a rechargeable battery. The battery may be a replaceable battery. The power source may comprise a power management unit. The power management unit may be configured to convert the first voltage into a second voltage. The power source may comprise a charging coil. The charging coil may be provided by the magnetic antenna.

The hearing device may comprise a memory, including volatile and non-volatile forms of memory.

The further body part of the user may be a torso, a hand, an arm, a foot, a leg, or other parts of the user's body. Preferably, the further body part is the torso of the user. The torso provides a large target for the radar sensor, when compared to other extremities such as a hand or a foot. Having a large target may ease location of the target for the radar sensor, hence facilitating the determination of the orientation of the head relative to the further body part of the user. Furthermore, in many cases the torso of the user provides a good reference point for further processing of audio data. However, for different applications it may be of higher interest tracking other body parts than the torso such as a hand or an arm, e.g., for virtual reality gaming or similar tracking of other body parts may be of the essence.

The first relative orientation may be a difference in orientation between the orientation in which the head is facing and an orientation of the further body part. An orientation of the further body part may for example be the front orientation of a torso, i.e., the orientation in which a torso a facing. The first relative orientation may be an absolute difference in orientation between the orientation in which the head is facing and the orientation of the further body part. The first relative orientation may be a relative difference in orientation between the orientation in which the head is facing and the orientation of the further body part.

The first relative orientation may be determined as a scalar value, e.g., the azimuth angle difference between the orientation of the head of the user and the orientation of the further body part of the user. The first relative orientation may be determined as a vector, e.g., the azimuth angle difference and the angle of elevation difference between the head of the user and the further body part of the user. The first relative orientation may be determined as a quaternion.

The orientation of the head of the user may be determined as a scalar value, e.g., the azimuth angle of the head in relation to the earth's frame of reference. The orientation of the head of the user may be determined as a vector, e.g., the azimuth angle and the angle of elevation of the head in relation to the earth's frame of reference. The orientation of the head of the user may be determined as a quaternion.

Although, the orientation of the head of the user and the first relative orientation have been described in polar coordinates with reference to azimuth angle and angle of elevation, it is clear for the person skilled in the art that other suitable coordinate systems may be equally applicable, for example cartesian coordinates or spherical coordinates may be used.

The first radar sensor may be any sensor capable of emitting an electromagnetic wave and converting the echo signal from the emitted electromagnetic wave into an electrical signal. The first radar sensor may emit radio waves. The first radar sensor may emit laser light, e.g., the radar sensor being a Lidar sensor. The first radar sensor may comprise a transmitting antenna and a receiving antenna, in some embodiments the transmitting antenna and the receiving antenna is the same antenna. The first radar sensor may be wired or wirelessly connected to the processing unit to allow for data obtained by the radar sensor to be transmitted to the processing unit.

Preferably, the first radar sensor is arranged on or near an outer surface of the first housing of the hearing device. Arranged near the outer surface may be understood as within 0-10 mm of the outer surface. By arranging the first radar sensor on or near the outer surface it may minimize blockage of the signal emitted by the radar sensor. The first radar sensor may be arranged on or near an outer surface of the first housing of the hearing device facing a torso of the user, when the hearing device is being worn by the user. Preferably, the first radar sensor is arranged facing toward the torso when the hearing device is worn by the user, e.g., if the hearing device is a headset comprising an ear cup the first radar sensor may be arranged on a lower part of the ear cup which faces towards the torso of the user when the headset is worn by the user. The first radar sensor may be connected to the first housing of the hearing device.

The first radar data may be contained in an electrical signal generated by the first radar sensor. The first radar sensor may be configured to transmit the electrical signal containing the first radar data to the processing unit by a wired or wireless connection. The first radar data is indicative of an orientation of a head of the user relative to a further body part of the user, e.g., the first relative orientation may be read directly from the radar data, or it may require additional processing of the first radar data to determine the first relative orientation.

The processing unit may comprise a memory. Alternatively, the processing unit may be communicatively connected to the memory. The memory may store previously obtained radar data. The memory may store a library of measurements relating radar data to first relative orientations. The processing unit may be configured to determine the first relative orientation based on a comparison between the first radar data and the library storing measurements relating radar data to first relative orientations.

The processing unit may comprise a machine learning model trained to determine a first relative orientation based on radar data. The machine learning model may be trained by supervised learning with a labelled training data set. The machine learning model may be trained by semi-supervised learning with a training data set comprising both labelled and unlabeled data. The training data set may have been achieved in a lab setting, by providing one or more mannequins and/or one or more users with a hearing device provided with a radar sensor and then measuring the orientation of the head of the one or more mannequins and/or the one or more users relative to the further body part of the user by other means, e.g. accelerometers, gyroscopes and/or magnetometers mounted on a torso and a head of the mannequins, and then correlating the measured orientations with radar data received from the radar sensor. The machine learning model may be an off-line trained neural network.

The neural network may comprise one or more input layers, one or more intermediate layers, and/or one or more output layers. The one or more input layers of the neural network may receive the radar data as the input. The machine learning model may be a neural network. The machine learning model may be trained to receive radar data as input and outputting a first relative orientation corresponding to the received radar data. In some embodiments the machine learning model may be trained to receive radar data as input and outputting a head-related transfer function corresponding to the received radar data. The machine learning model may be stored in memory of the hearing device. The machine learning model may be a deep neural network. The deep neural network may be a recurrent neural network (e.g., one to one, one to many, many to one, many to many). The deep neural network may be a convolutional neural network. The deep neural network may be a Region-Based Convolutional Neural Network. The deep neural network may be a gaussian mixture model. The deep neural network may be a regression model. The deep neural network may be a linear factorization model. The deep neural network may be a kernel regression model. The deep neural network may be a Non-Negative Matrix Factorization model.

The processing unit may comprise a library storing measurements relating radar data to orientations of the head of the user relative to the further body part of the user. The processing unit may be configured to determine the first relative orientation by comparing the received first radar data to the library storing measurements relating radar data to orientations of the head of the user relative to the further body part of the user. The data for creating the library may be achieved in a corresponding manner as the above explained training data set. The library may be stored on a memory of the hearing device.

Alternatively, the processing unit may determine the first relative orientation by transmitting the first radar data to an external processing unit. The external processing unit may be configured to process the first radar data to determine the first relative orientation.

The processing unit may be configured to determine the first relative orientation by reading the first data.

The processing unit may be arranged in or otherwise connected to the first housing of the hearing device.

In an embodiment the hearing device comprises an orientation sensor configured for obtaining orientation data regarding a head orientation of the user, wherein the processing unit is further configured to receive the orientation data from the orientation sensor, and determine, based on the orientation data, the head orientation of the user.

The orientation sensor may comprise an inertial measurement unit. The orientation sensor may comprise one or more of the following: an accelerometer, a gyroscope, a magnetometer, and an inertial measurement unit (IMU).

The determined head orientation may be used for processing an audio signal. The determined head orientation may be used in tandem with the first relative orientation to process an audio signal.

In an embodiment the hearing device further comprises an orientation sensor configured for obtaining orientation data regarding a head orientation of the user, wherein the processing unit is further configured to receive orientation data from the orientation sensor over a first period, based on the received orientation data, determine a change in the head orientation of the user over the first period, compare the change in the head orientation to a movement threshold, based on the comparison between the head orientation and the movement threshold, activate the first radar sensor to obtain first radar data indicative of the first relative orientation, receive the first radar data from the first radar sensor, and based on the received first radar data, determine the first relative orientation.

Consequently, both battery power and processing power may be saved by refraining from continuously running the first radar sensor.

The movement threshold may be set as a range of azimuth angles and/or angles of elevation. The range of azimuth angles and/or angles of elevation may be −15° to 15°, −10° to 10°, −5° to 5°, or −1° to 1°. The movement threshold may be set as a maximum value for azimuth angles and/or angles of elevation.

The comparison with the movement threshold may be to check if the movement threshold has been exceeded by the change in head orientation.

In an embodiment the processing unit is further configured to activate the first radar sensor to obtain first radar data indicative of the first relative orientation in response to determining a first period has passed, wherein the first period is in the range of 0.005 s to 1 s, preferably in the range of 0.01 s to 0.5 s, receive the first radar data from the first radar sensor, and determine, based on the received first radar data, the first relative orientation.

Consequently, both battery power and processing power may be saved by refraining from continuously running the first radar sensor.

In an embodiment the processing unit is further configured to, based on the first relative orientation, calibrate the orientation sensor.

Consequently, drift of the orientation sensor over time may be compensated for.

The determination for when the processing unit should calibrate the orientation sensor may be achieved in multiple ways. The processing unit may be configured to compare the first relative orientation to a reference orientation, and to calibrate the orientation sensor, based on the comparison between the first relative orientation and the reference position. The reference orientation may be a zero orientation, i.e., wherein the azimuth angle and the angle of elevation of the orientation of the head of the user relative to the further body par is substantially zero. The reference orientation may be a range of orientations, i.e., wherein the azimuth angle and the angle of elevation of the orientation of the head of the user relative to the further body par are close to zero, e.g. −15° to 15°, −10° to 10°, −5° to 5°, or −1° to 1°. Alternatively, the reference position may be set as any orientation value. The comparison may be to determine if the first relative orientation and the reference orientation orientations are substantially equal, or to determine whether the first relative orientation is within the range of the reference orientation. If the comparison comes out positive, i.e., if the two orientations are substantially equal, or if the first relative orientation is within the range of the reference orientation, the processing unit may calibrate the orientation sensor. Calibration of the orientation sensor may be performed as part of a start-up sequence of the hearing device, e.g., when starting the hearing device the first relative orientation may be used for calibrating the orientation sensor. Alternatively, and/or in combination the calibration of the orientation sensor may be performed periodically in response to the processing unit determined a period having passed, for example determining 1 second, 5 seconds, 10 second and/or 1 minute having passed.

Calibration of the orientation sensor may comprise resetting the orientation sensor to remove accumulated integration errors resulting in drift or similar. Calibration of the orientation sensor may comprise resetting the orientation sensor to output a zero measurement for the head orientation. For example, if the reference position is defined at an origin head orientation, the calibration may be performed by determining the first relative orientation is at origin, i.e., the orientation of the further body part and the head orientation being equal, and then setting the orientation sensor to output a zero measurement. Calibration of the orientation sensor may comprise coordinate transforming the orientation data from the orientation sensor from a coordinate system having gravity or the earth's magnetic field defining the coordinate system, dependent on which kind of orientation sensor is used, to a coordinate system defined by the further body part. In one embodiment, the calibration is performed by setting the head orientation from the orientation data equal to the first relative orientation determined from the first radar data.

In an embodiment the hearing device further comprises an orientation sensor configured for obtaining orientation data regarding a head orientation of the user, and the processing unit is further configured to activate the first radar sensor to obtain first radar data indicative of the first relative orientation in response to determining a first period has passed, where the first period is in the range of 0.005 s to 1 s, preferably in the range of 0.01 s to 0.5 s, receive the first radar data from the first radar sensor, determine, based on the received first radar data, the first relative orientation, and based on the determined first relative orientation, calibrate the orientation sensor. Alternatively, or in combination, calibration of the orientation may be performed in response to determining a change in the head orientation. In an embodiment the hearing device further comprises an orientation sensor configured for obtaining orientation data regarding a head orientation of the user, where the processing unit is further configured to receive orientation data from the orientation sensor over a first period, based on the received orientation data, determine a change in the head orientation of the user over the first period, compare the change in the head orientation to a movement threshold, based on the comparison between the head orientation and the movement threshold, activate the first radar sensor to obtain first radar data indicative of the first relative orientation, receive the first radar data from the first radar sensor, and based on the received first radar data, determine the first relative orientation, and based on the determined first relative orientation, calibrate the orientation sensor.

In an embodiment the first radar sensor is configured to emit a radio signal at a frequency of 40 GHz-120 GHz, preferably 50 GHz-100 GHz, and even more preferred 55 GHz-65 GHz.

Having the first radar sensor emit a radio signal at a frequency in the range of 40 GHz-120 GHz allows the first radar sensor to achieve a high enough resolution to correctly capture a target of interest, i.e., a further body part of the user.

In an embodiment the first radar sensor comprises a phased array.

Having a first array allows for beam steering of the radio signal emitted by the first radar sensor. A phased array may further decrease the first radar sensors reliance on correct positioning on the hearing device as the beam steering allows for one to compensate for misalignments or mispositioning of hearing device.

Furthermore, a phased array may achieve a higher signal to noise ratio as compared to traditional fixed phased arrays. The phased array may be set with a fixed directionality, or the external processing unit may be configured to control a directionality of the phased array.

In an embodiment the phased array comprises at least four antennas.

The applicant has found a phased array comprising four antennas sufficient to detect an orientation of a head of the user relative to a further body part of the user. In hearing devices space may be severely limited, hence limiting the amount of space required for the first radar sensor may be necessary. Thus, by having a phased array with four antennas a compact first radar sensor may be achieved.

In an embodiment the external processing unit is further configured to control a phase relation of antennas within the phased array to perform a scan of a user wearing the hearing device.

In an embodiment the processing unit is further configured to receive an audio signal and process the received audio signal based on the determined first relative orientation.

Hence, optimized audio processing may be achieved which accounts for the difference in head orientation and torso orientation.

In an embodiment the processing unit is further configured to receive an audio signal and process the received audio signal based on the determined first relative orientation and the determined head orientation.

Processing if the audio signal is explained more in-depth in relation to the second aspect of the disclosure. In the second aspect of the disclosure, it is described that audio processing is performed by an external processing unit, however, the processing steps performed by the external processing unit may as well be performed by the processing unit in the hearing device. However, to avoid redundancy further explanation of the audio processing has been kept to the second aspect, although it is equally applicable to the first aspect and may as well be performed by the processing unit of the hearing device.

In an embodiment the hearing device is a headset, or a pair of earbuds.

In an embodiment the hearing device further comprises a second housing for being worn at and/or in a second ear of a user, and a second radar sensor configured for obtaining second radar data indicative of the orientation of a head of the user relative to a further body part of the user, and wherein the processing unit is further configured to receive the second radar data from the second radar sensor, and determine, based on the received first radar data and the received second radar data, the orientation of a head of the user relative to a further body part of the user.

Having both a first radar sensor and a second radar sensor arranged on opposing sides of the head may allow for radar data of a higher quality to be received by the processing unit, hence, facilitating a more precise determination of the orientation of a head of the user relative to a further body part of the user.

The second housing may be substantially identical to the first housing. The second housing may differ from the first housing, e.g., the first housing may have a first radar sensor connected to it whereas the second housing may be provided without a radar sensor connected to it. A processing unit may be connected to or arranged in the second housing, alternatively, sensors associated with the second housing, e.g., a radar sensor and an orientation sensor, may be configured to transmit sensor data to a processing unit external to the second housing, e.g., a processing unit associated with the first housing.

According to a second aspect of the disclosure there is provided a hearing system comprising a hearing device, comprising a first housing for being worn at and/or in a first ear of a user, and
a processing unit configured to control functionality of the hearing device,
characterized in that, the hearing device further comprises a first radar sensor configured for obtaining first radar data indicative of a difference in the orientation of a head of the user and a further body part of the user, and wherein the processing unit is further configured to receive the first radar data from the first radar sensor, the hearing system further comprises an external processing unit, wherein the external processing unit is configured to receive an audio signal, receive the first radar from the processing unit, determine, based on the first radar data, a first relative orientation, wherein the first relative orientation is a difference in the orientation of the head of the user and the further body part of the user, process the received audio signal based on the determined relative orientation between the further body part of the user and the head of the user, and transmit the processed audio signal to the processing unit.

Consequently, a hearing system is provided which may provide an improved audio signal. Processing received audio signal, based on the determined relative orientation between the further body part of the user and the head of the user, may facilitate the creation of more immersive audio signal, and allow for improved spatialization of the audio signal.

The external processing unit may be configured to determine the first relative orientation based on the first radar data. Alternatively, the first relative orientation is determined by the processing unit in the hearing device, and subsequently transmitted to the external processing unit.

The external processing unit may receive an audio signal from a device external to the external processing unit, e.g., a smart device, a computer, a phone, or other electronic devices. The external processing unit may be configured to communicate with an external device over a short-range wireless network such as a Bluetooth network, a near field magnetic inductance network, or similar. The external processing unit may be configured to communicate with an external device over a long-range wireless network such as a mobile network, a Wi-Fi network, or similar. The external processing unit may receive the audio signal from a memory associated with the processing unit. The external processing unit may be a component in a smart device, a computer, a phone, or other electronic devices. The external processing unit may be comprised by an audio renderer.

An audio signal is in the context of this disclosure to be interpreted broadly. An audio signal may be any signal which describes or is indicative of a sound wave or otherwise coding for a sound. For example, an audio signal may be an electrical signal which may be converted by a speaker to a soundwave. An audio signal may also be a sound wave, e.g., a sound wave incident on a microphone which may then be converted to an electrical signal. When stating the external processing unit is configured to receive an audio signal it may be understood as the external processing unit being configured to receive an electrical signal coding for a soundwave. An audio signal may be a 3D audio signal, a monophonic signal, and/or a stereo signal.

Processing of the received audio signal, based on the determined relative orientation between the further body part of the user and the head of the user, may be carried out in a plethora of ways. The audio signal may be a stereo signal configured to be played back over two channels, e.g., a right channel and a left channel. The hearing device may comprise a right speaker associated with the right channel and left speaker associated with the left channel. The external processing unit may then control a gain of the stereo signal in accordance with the determined relative orientation between the further body part of the user and the head of the user. For example, if a user turns their head to the right relative to the torso of the user, the gain through the right channel may be decreased and the gain through the left channel may be increased to simulate the change in head shadowing, hence creating a more immersive experience and creating a soundscape which is fixed based on the relative orientation between the torso of the user and the head of the user. In another example, a user may bend their head to the right relative to the torso of the user, the gain through the right channel may be decreased and the gain through the left channel may be decreased to simulate the change in head shadowing, torso shadowing, and torso reflection.

The external processing unit may be a spatial audio processor configured to receive an audio signal and spatially process the received audio signal, based on the first relative orientation. The external processing unit may be configured to determine a first filter, based on the first relative orientation, apply the first filter to the received audio signal to generate a first output signal. The first filter may be a torso filter.

The external processing unit may further be configured to send the processed audio signal to the processing unit of the hearing device. The external processing unit may be provided with a receiver, a transmitter, or a transceiver for sending and receiving wireless or wired signals.

In an embodiment the hearing system the external processing unit is further configured to, based on the determined orientation of the head of the user relative to the further body part of the user, render the received audio signal into a 3D audio signal.

A 3D audio signal is in the context of this disclosure to be understood as an audio signal comprising sound sources which has been virtually placed in a three-dimensional space around the user, thus giving the illusion to a user that sound is emanating from a point in space around the user, e.g., in front of the user, behind the user, besides the user, etc. Alternatively, a 3D audio signal may be understood as an audio signal which may be rendered into a spatialized audio signal, which when played back through a speaker comprises sound sources virtually placed in a three-dimensional space around the user. A 3D audio signal may comprise a binaural audio signal and spatial metadata. A 3D audio signal may comprise a binaural audio signal.

In an embodiment the external processing unit is further configured to, based on the first relative orientation, spatially lock the received audio signal to the further body part of the user.

Consequently, a more immersive spatial soundscape may be obtained which follows the orientation of the further body part of the user. Furthermore, in contrast to conventional solutions, where the audio signal is spatially locked to head movement in the earth frame of reference, e.g. as defined by either gravity in the case of a gyroscope or defined by the earth's magnetic field in the case of a magnetometer, the present solution may lock the audio signal to head movement in user frame reference defined by the further body part, hence, a more robust spatialization is obtained, which is not affected by the user as a whole turning, e.g., caused by the user being in a vehicle turning or similar, instead the spatialization of the audio is reliant on relative movement of the user, i.e., the user moving their head in relation to the further body part of the user.

The external processing unit may be configured to spatial lock the audio signal by defining a first coordinate system wherein the further body part is the origin, and processing the audio signal, based on the first coordinate system.

The external processing unit may be configured to spatial lock the audio signal by determining a 3D soundscape within the received audio signal and lock the determined 3D soundscape to the further body part of the user, based on the first relative orientation.

In an embodiment the hearing device further comprises an orientation sensor configured for obtaining head orientation data regarding a head orientation of the user, and wherein the external processing unit is further configured to receive the head orientation data from the hearing device, determine a head orientation based on the received head orientation data, receive an audio signal, and based on the head orientation and the first relative orientation, spatially process the audio signal.

The audio signal received by the external processing unit may be a 3D audio signal. In a conventional headtracking spatial processor, the spatial processor will receive a head orientation signal from a sensor on the hearing device to produce suitable left and right channel audio signals. However, as mentioned earlier such systems do not consider the relative orientation between the head of the user and the rest of the user's body or consider torso shadowing or audio reflections of the torso of the user. In some situations, the difference between measuring the head orientation and measuring the orientation between head and the rest of the user's body may be negligible, e.g., if user is sitting stationary and only turning their head along the azimuth angle, however, in other situations it may be crucial to know the relative orientation. A problem for example which may arise with conventional headtracking systems is that shadowing effects caused by the body of the user not being accounted for.

Spatial processing may comprise determining a head filter based on the head orientation, determining a torso filter based on the first relative orientation and applying the head filter and the torso filter to the audio signal.

The external processing unit may be configured to process a received audio signal by applying one or more HRTF filters, based on the head orientation and the first relative orientation. Alternatively, the external processing unit may be configured to process a received audio signal by applying one or more HRTF filters, based on the first relative orientation. The external processing unit may comprise a HRTF database correlating different first relative orientation to one or more HRTF filters, HRTF filter parameters, and/or HRTFs. In such embodiments the HRTF database may comprise several HRTF databases. In such implementations each database contains filters for a specific combination of azimuth angle and/or angle of elevation. Alternatively, the HRTF may be generated by a parametric model receiving as input the first relative orientation. The external processing unit may comprise a HRTF database correlating different head orientations and first relative orientation to one or more HRTF filters, HRTF filter parameters, and/or HRTFs. In such embodiments the HRTF database may comprise several HRTF databases. In such implementations each database contains filters for a specific combination of azimuth angle and/or angle of elevation. Alternatively, the HRTF may be generated by a parametric model receiving as input the first relative orientation and the head orientation.

The external processing unit may be configured to determine a head filter, based on the head orientation, determine a torso filter, based on the first relative orientation, and to process the received audio signal by applying the head filter and the torso filter to the audio signal.

The head filter and the torso filter may be considered as subcomponents of a HRTF filter. The torso filter may be determined by comparing the first relative orientation to a database containing torso filters corresponding to different specific combinations of azimuth angle and/or angle of elevation. The head filter may be determined by comparing the head orientation to a database containing head filters corresponding to different specific combinations of azimuth angle and/or angle of elevation.

In an embodiment the external processing unit is further configured to, based on the first relative orientation, determine a head related transfer function, HRTF, and process the received audio signal based on the determined HRTF.

In an embodiment the hearing device further comprises an orientation sensor configured for obtaining orientation data regarding a head orientation of the user, wherein the external processing unit is further configured to receive the orientation data from the orientation sensor and based on the orientation data and the first relative orientation, determine a head related transfer function, HRTF.

As mentioned, the HRTF may be determined by comparing the head orientation and the first relative orientation to a HRTF database or by comparing the first relative orientation to the HRTF database. The determined HRTF may be used for processing the received audio signal, e.g., the determined HRTF may be used for determining one or more HRTF filters to apply to the audio signal.

In the above in relation to the second aspect, the disclosure has been described as a system comprising an external processing unit performing audio processing based on sensor data received from the processing unit in the hearing device, however, in other embodiments processing of an audio signal as described in relation to the external processing unit may be performed fully or at least partly by the processing unit in the hearing device. Having processing of the audio signal performed by the processing unit in the hearing device may reduce a latency of the processing as it obviates the need for transmitting sensor data from the processing unit to the external processing unit. The reason for performing processing of audio signal on the external processing unit may be caused by lack of processing power in the processing unit of the hearing device or caused by transmittance limitations between the processing unit and the external processing unit. In some embodiments part of the rendering of the 3D audio signal may be performed by the external processing unit and the processing unit may further process the audio signal received from the external processing unit, based on the first relative orientation, an example of a similar set-up is described in WO 2017/223110 A1 which discloses a system and method of modifying a binaural signal using headtracking information. The system calculates a delay, a first filter response, and a second filter response, and applies these to the left and right components of the binaural signal according to the headtracking information. The system may also apply headtracking to parametric binaural signals. In this manner, headtracking may be applied to pre-rendered binaural audio.

According to a third aspect of the disclosure a method for determining an orientation of a head of the user relative to a further body part of the user is provided, the method comprises the steps of receiving first radar data from a first radar sensor connected to a first housing worn at and/or in a first ear of the user, wherein the first radar data is indicative of an orientation of a head of the user relative to a further body part of the user, and determine, based on the received first radar data, an orientation of a head of the user relative to a further body part of the user.

The method may be a computer implemented method.

An advantage described in conjunction with a particular embodiment is not necessarily limited to that embodiment or aspect and can be practiced in any other embodiments even if not so explicitly described.

Within this document, the singular forms "a", "an", and "the" specify the presence of a respective entity, such as a feature, an operation, an element, or a component, but do not preclude the presence or addition of further entities. Likewise, the words "have", "include" and "comprise" specify the presence of respective entities, but do not preclude the presence or addition of further entities. The term "and/or" specifies the presence of one or more of the associated entities.

BRIEF DESCRIPTION OF THE DRAWINGS

The disclosure will be explained in more detail below together with preferred embodiments and with reference to the drawings in which.

The figures are schematic and simplified for clarity, and they just show details essential to understanding the disclosure, while other details may be left out. Where practical, like reference numerals and/or labels are used for identical or corresponding parts.

DETAILED DESCRIPTION OF THE DRAWINGS

The detailed description given herein and the specific examples indicating embodiments of the disclosure are intended to enable a person skilled in the art to practice the disclosure and should thus be regarded as an illustration of the disclosure. The person skilled in the art will be able to readily contemplate further applications of the present disclosure as well as advantageous changes and modifications from this description without deviating from the scope of the disclosure. Any such changes or modifications mentioned herein are meant to be non-limiting for the scope of the disclosure. An advantage described in conjunction with a particular embodiment is not necessarily limited to that embodiment and can be practiced in any other embodiments even if not so illustrated, or if not so explicitly described.

Figure 1:
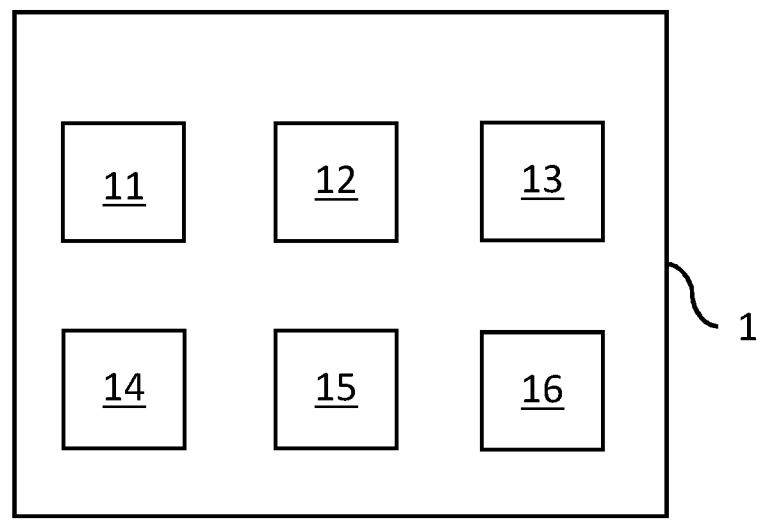
FIG. 1 shows a box diagram of a hearing device according to an embodiment of the disclosure.

Referring initially to FIG. 1 showing a box diagram of a hearing device 1 according to an embodiment of the disclosure. The hearing device 1 comprises a first housing 11 for being worn at and/or in a first ear of a user. The first housing 11 may comprise attachment means for attaching the hearing device at and/or in the first ear of the user. The first housing 11 may be an earcup, an earbud housing or similar. The hearing device 1 comprises a processing unit 12. The processing unit 12 is configured to control functionality of the hearing device 1. Functionality may comprise the processing of a received audio signal, control of playback of an audio signal, a shutdown function of the hearing device, or other features of the hearing device. The hearing device 1 further comprises a first radar sensor 13 configured for obtaining first radar data indicative of an orientation of a head of the user relative to a further body part of the user. The processing unit 12 is configured to receive the first radar data from the first radar sensor 13, and, based on the first radar data, to determine a first relative orientation, wherein the first relative orientation is a difference in the orientation of the head of the user and the further body part of the user. The hearing device 1 further comprises an orientation sensor 14 configured for obtaining orientation data regarding a head orientation of the user. The hearing device 1 further comprises a second housing 15 for being worn at and/or in a second ear of a user, and a second radar sensor 16 configured for obtaining second radar data indicative of the orientation of a head of the user relative to a further body part of the user. The processing unit 12 is further configured to receive the second radar data from the second radar sensor 16, and determine, based on the received first radar data and the received second radar data, the first relative orientation. The orientation sensor is in the shown embodiment an inertial measurement unit, IMU.

Figure 2:
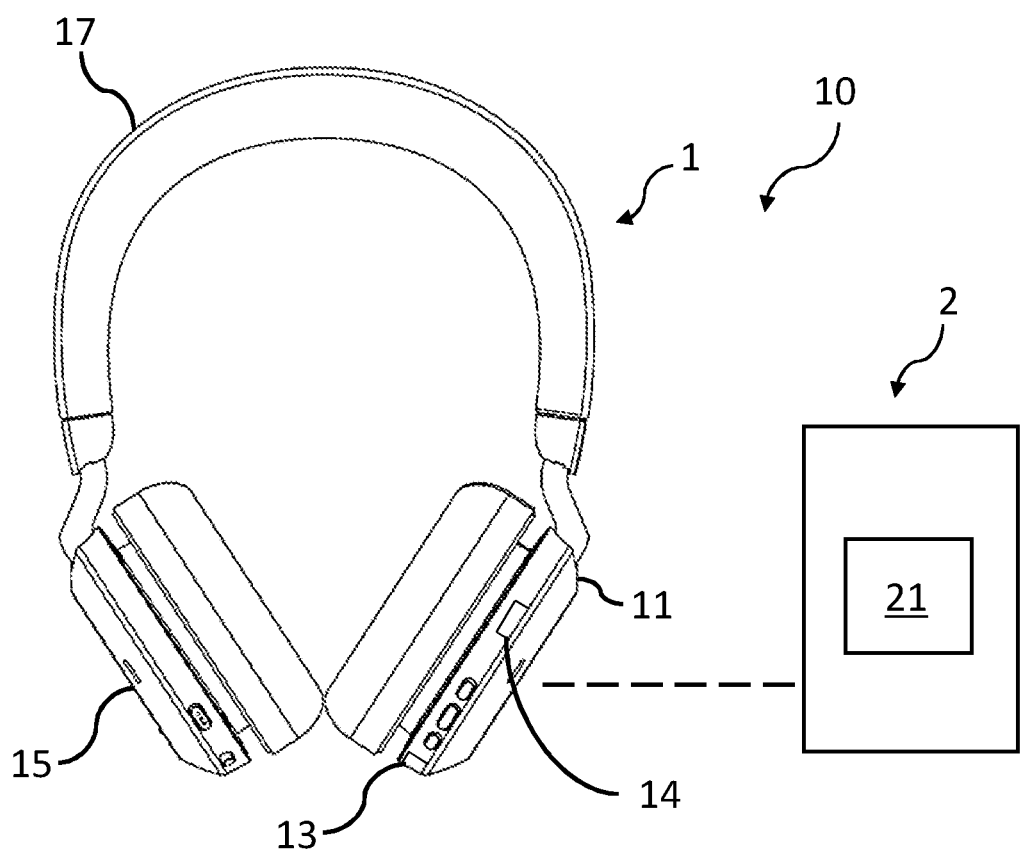
FIG. 2 shows a schematic drawing of a hearing system according to an embodiment of the disclosure.

Referring to FIG. 2 showing a schematic drawing of a hearing system 10 according to an embodiment of the disclosure. The hearing system 10 comprises a hearing device communicatively connected to an external processing unit 21, either through a wired or a wireless connection. The external processing unit 21 is arranged within an external device 2, such as a mobile, a computer, or a smart device. The hearing device 1 is provided as a headset 1. The headset comprises a first earcup 11 and a second earcup 15. The earcups 11 and 15 are connected via a head strap 17. The earcups 11 and 15 are configured to be arranged on the ears of a user. Connected to the first earcup 11 is a first radar sensor 13 and an orientation sensor 14. In other embodiments a second radar sensor and/or an additional orientation sensor may be connected to the second earcup 15. In yet other embodiments the sensors 13 and 14 are connected to the head strap 17 of the hearing device 1. The external processing unit 21 is configured to receive an audio signal. The audio signal may be received by the external processing unit 21 via a cellular network, a wired network, or other kinds of wireless networks. The external processing unit 21 is configured to receive the first radar data from the processing unit 12, determine, based on the first radar data, a first relative orientation, wherein the first relative orientation is a difference in the orientation of the head of the user and the further body part of the user, and process the received audio signal based on the determined first relative orientation. The hearing device 1 further comprises an orientation sensor 14 configured for obtaining orientation data regarding a head orientation of the user wearing the hearing device. The external processing unit 21 is further configured to determine a head related transfer function, HRTF, based on the first relative orientation and/or orientation data received from the orientation sensor 14.

Figure 3:
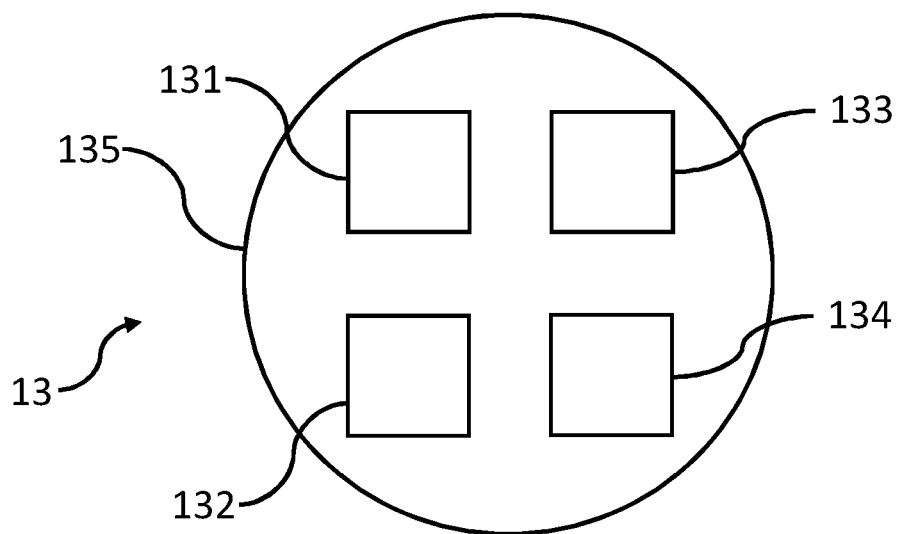
FIG. 3 shows a schematic top view of a radar sensor according to an embodiment of the disclosure.

Referring to FIG. 3 showing a schematic top view of a radar sensor 13 according to an embodiment of the disclosure. The radar sensor 13 comprises a substrate 135. The substrate 135 is depicted as being substantially circular when viewed from the top, however, the substrate 135 is not limited to a circular shape but may assume any shape appropriate and may be formed with a complementary shape to a hearing device 1 or a hearing device housing 11 and 15. Arranged on the substrate 135 are four antennas 131, 132, 133, and 134. The antennas 131, 132, 133, and 134 are configured to emit a radio signal at a frequency of 40 GHz-120 GHz, preferably 50 GHz-100 GHz, and even more preferred 55 GHz-65 GHz. The antennas 131, 132, 133, and 134 arranged on the substrate 135 form a phased array. The processing unit 12 of the hearing device 1 is configured to control a phase relation of the antennas 131, 132, 133, and 134 in the phased array to perform a scan of a user wearing the hearing device 1.

Figure 4:
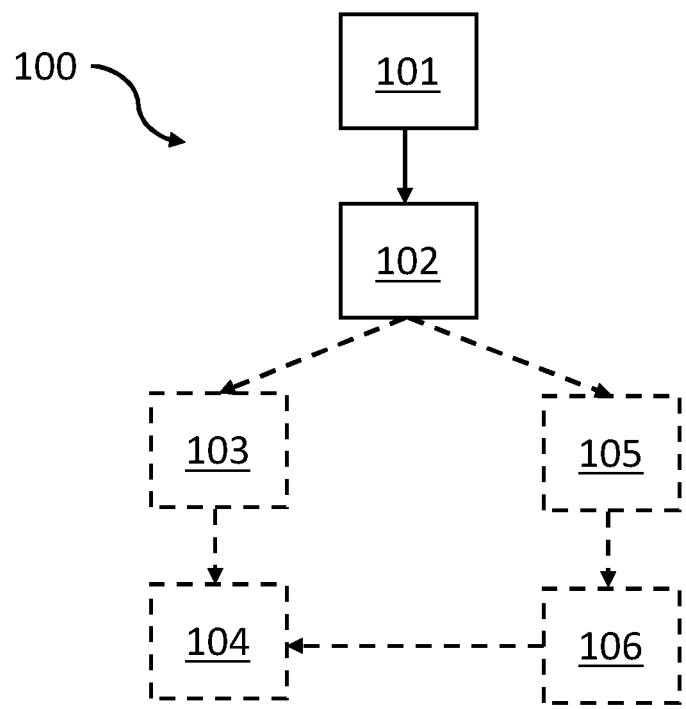
FIG. 4 shows a flow diagram of a method according to an embodiment of the disclosure.

Referring to FIG. 4 showing a flow diagram of a method 100 according to an embodiment of the disclosure. The method 100 may be a computer implemented method. The method 100 being for determining an orientation of a head of the user relative to a further body part of the user. In a first step the method comprises receiving 101 first radar data from a first radar sensor 13, where the first radar data is indicative of an orientation of a head of the user relative to a further body part of the user. In a second step the method comprises determining 102, based on the received first radar data, an orientation of a head of the user relative to a further body part of the user. In a third step the method may comprise receiving 103 an audio signal. The audio signal may be received from an external source, e.g., a smart device or a computer. The audio signal may be a biaural audio signal, a stereo audio signal, a mono audio signal. The audio signal may comprise meta data to facilitate processing of the audio signal. In a fourth step the method may comprise processing 104 the received audio signal based on the determined first relative orientation. In a fifth step the method may comprise calibrating 105 an orientation sensor 14, based on the first relative orientation. Orientation data from the calibrated orientation sensor 14 may be used in processing the audio signal in the fourth step.

The disclosure is not limited to the embodiments disclosed herein, and the disclosure may be embodied in other ways within the subject-matter defined in the following claims. As an example, further features of the described embodiments may be combined arbitrarily, e.g., to adapt devices according to the disclosure to specific requirements.

Any reference numerals and labels in the claims are intended to be non-limiting for the scope of the claims.

The invention claimed is:

1. A hearing device, comprising:
 a first housing for being worn at a first ear of a user, and
 a processing unit configured to control functionality of the hearing device,
 a first radar sensor configured to obtain first radar data indicative of a difference in the orientation of a head of the user and a further body part of the user,
 an orientation sensor configured to obtain orientation data regarding a head orientation of the user, and wherein the processing unit is further configured to:
  receive the first radar data from the first radar sensor,
  receive the orientation data from the orientation sensor,
  determine, based on the orientation data, the head orientation of the user,
  output the head orientation of the user,
  determine, by inputting the first radar data into an input layer of an off-line trained neural network, a first relative orientation,
   wherein the first relative orientation is a difference in the orientation of the head of the user and the further body part of the user,
  output the first relative orientation, and
  based on the first relative orientation, calibrate the orientation sensor periodically by removing accumulated integration errors setting the head orientation from the orientation data equal to the first relative orientation determined from the first radar data.

2. A hearing device according to claim 1, wherein the orientation sensor is one or more of a gyroscope, an accelerometer, a magnetometer, or an inertial measurement unit, IMU.

3. A hearing device according to claim 1, wherein the first radar sensor is configured to emit a radio signal at a frequency of 55 GHz-65 GHz.

4. A hearing device according to claim 1, wherein the first radar sensor comprises a phased array.

5. A hearing device according to claim 4, wherein the phased array comprises at least four antennas.

6. A hearing device according to claim 4, wherein the processing unit is further configured to:
control a phase relation of antennas within the phased array to perform a scan of a user wearing the hearing device.

7. A hearing device according to claim 1, wherein the processing unit is further configured to:
receive an audio signal, and
process the received audio signal based on the determined first relative orientation.

8. A hearing device according to claim 1, wherein the hearing device is a headset, or a pair of earbuds.

9. A hearing device according to claim 1, wherein the hearing device further comprises:
a second housing for being worn at a second ear of a user; and
a second radar sensor configured to obtain second radar data indicative of the orientation of a head of the user relative to a further body part of the user, and
wherein the processing unit is further configured to:
receive the second radar data from the second radar sensor, and
determine, based on the received first radar data and the received second radar data, the orientation of a head of the user relative to a further body part of the user.

10. A hearing device according to claim 1, wherein the first radar sensor is configured to emit a radio signal at a frequency of 40 GHz-120 GHz.

11. A hearing device according to claim 1, wherein the first radar sensor is configured to emit a radio signal at a frequency of 50 GHz-100 GHz.

12. A hearing system, comprising:
a hearing device, comprising:
a first housing for being worn at a first ear of a user, and
a processing unit configured to control functionality of the hearing device;
a first radar sensor configured to obtain first radar data indicative of a difference in the orientation of a head of the user and a further body part of the user;
an orientation sensor configured to obtain orientation data regarding a head orientation of the user;
wherein the processing unit is further configured to:
receive the first radar data from the first radar sensor,
receive the orientation data from the orientation sensor,
output the head orientation of the user,
determine, by inputting the first radar data into an input layer of an off-line trained neural network, a first relative orientation,
wherein the first relative orientation is a difference in the orientation of the head of the user and the further body part of the user, output the first relative orientation, and
based on the first relative orientation, calibrate the orientation sensor periodically by removing accumulated integration errors and setting the head orientation from the orientation data equal to the first relative orientation determined from the first radar data; and
an external processing unit configured to:
receive an audio signal,
receive the first relative orientation from the processing unit,
process the received audio signal based on the received first relative orientation, and
transmit the processed audio signal to the processing unit.

13. A hearing system according to claim 12, wherein the external processing unit is further configured to:
based on the first relative orientation, render the received audio signal into a 3D audio signal.

14. A hearing system according to claim 12, wherein the hearing device comprises an orientation sensor configured for obtaining head orientation data regarding a head orientation of the user, wherein the external processing unit is further configured to:
receive the head orientation data from the hearing device,
determine a head orientation,
based on the head orientation and the first relative orientation, determine a head related transfer function, HRTF, and
process the received audio signal based on the determined HRTF.

15. A method for determining an orientation of a head of the user relative to a further body part of the user, the method comprises the steps of:
receiving first radar data from a first radar sensor connected to a first housing worn at a first ear of the user, wherein the first radar data is indicative of an orientation of a head of the user relative to a further body part of the user,
determining, by inputting the first radar data into an input layer of an off-line trained neural network, an orientation of a head of the user relative to a further body part of the user,
receiving an audio signal,
processing the received audio signal based on the determined orientation and
calibrating an orientation sensor, based on the determined orientation periodically by removing accumulated integration errors and resetting the orientation sensor to output a zero measurement for the orientation of the head of the user.

* * * * *